United States Patent [19]

Nostrand

[11] 4,187,136
[45] Feb. 5, 1980

[54] METHOD OF MAKING A GRADUATED DENSITY LIQUID FILTER ELEMENT

[75] Inventor: William G. Nostrand, Stoughton, Wis.

[73] Assignee: Nelson Industries, Inc., Stoughton, Wis.

[21] Appl. No.: 896,182

[22] Filed: Apr. 14, 1978

[51] Int. Cl.² ............ B31C 13/00; B65H 81/08
[52] U.S. Cl. ............... 156/192; 29/163.5 F; 242/7.02; 210/315; 210/489; 210/492; 210/494 R
[58] Field of Search ............ 55/486, 487, 520; 210/168, 295, 315, 338, 484, 489, 490, 491, 492, 494, 497.1; 264/257, 258, 295, 339, DIG. 48; 29/163.5 F; 242/7.02, 67.1 R, 7.23, 67.3 R, 56.1; 156/185, 191, 192, 195, 215

[56] References Cited

U.S. PATENT DOCUMENTS

| | | | |
|---|---|---|---|
| 1,606,647 | 11/1926 | McCutcheon | 210/492 |
| 2,798,614 | 5/1957 | Alexander | 210/484 |
| 2,850,168 | 9/1958 | Nostrand | 210/295 |
| 3,016,345 | 1/1962 | Price | 210/315 |
| 3,020,977 | 2/1962 | Huppke | 156/192 |
| 3,042,216 | 7/1962 | Goldman | 210/489 |
| 3,063,888 | 11/1962 | Howard | 55/487 |
| 3,102,014 | 8/1963 | Aitkenhead | 55/487 |
| 3,140,968 | 7/1964 | Barrios | 242/7.23 |
| 3,323,963 | 6/1967 | Summers | 156/192 |
| 3,384,241 | 5/1968 | Nostrand | 210/315 |
| 3,415,384 | 12/1968 | Kasten | 210/492 |
| 3,443,366 | 5/1969 | Schwab | 210/338 |

FOREIGN PATENT DOCUMENTS

| | | | |
|---|---|---|---|
| 2028664 | 6/1970 | Fed. Rep. of Germany | 210/315 |
| 699168 | 10/1953 | United Kingdom | 210/492 |

*Primary Examiner*—Robert H. Spitzer
*Assistant Examiner*—Ernest G. Therkorn
*Attorney, Agent, or Firm*—Andrus, Sceales, Starke & Sawall

[57] ABSTRACT

A graduated density liquid filter element for use in an internal combustion engine. Two layers of fibrous media of dissimilar size and having different permeability are disposed in partially overlapping relation and wound in coiled form to provide a generally cylindrical filter element in which resistance to the flow of the liquid varies along the length of the element.

4 Claims, 5 Drawing Figures

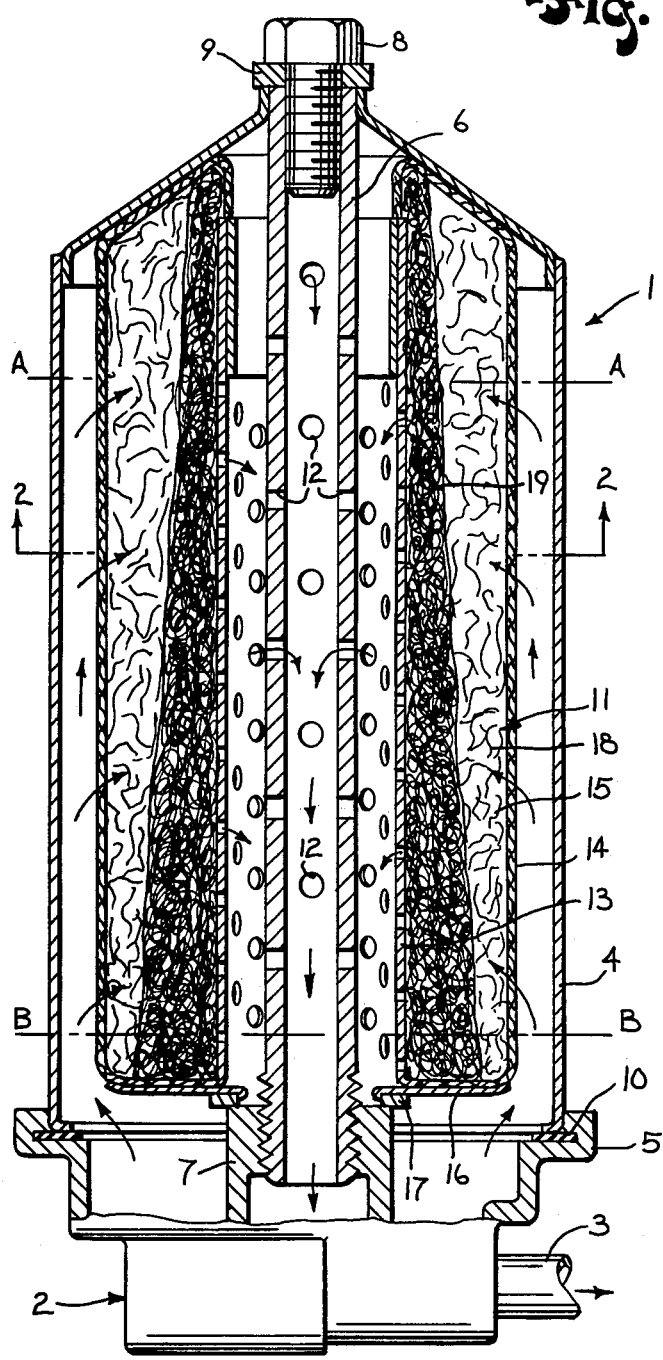
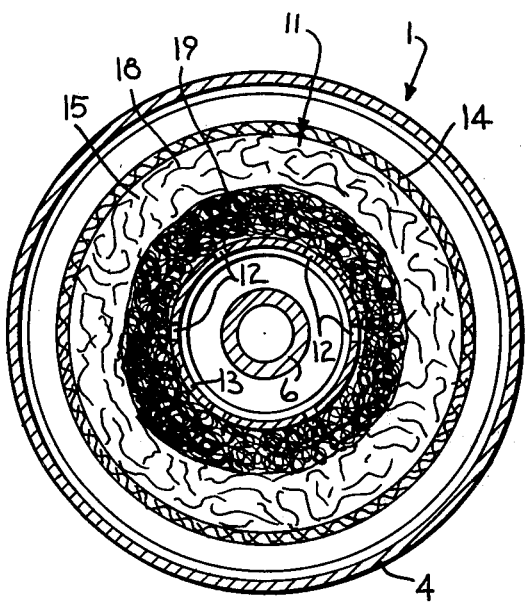
Fig. 1
Fig. 2

METHOD OF MAKING A GRADUATED DENSITY LIQUID FILTER ELEMENT

BACKGROUND OF THE INVENTION

A filter element for filtering oils and other liquids should remove a maximum amount of the particulate material while offering minimum resistance to flow of the liquid and should have adequate capacity to provide a useful life of service. A relatively coarse filtering media permits readily flow of the liquid through the element but serves to remove only the coarser particles. On the other hand, the use of a relatively fine filtering media results in the removal of both fine and coarse particles, but the useful life of such an element is unduly limited by clogging of the surface and consequent resistance to liquid flow. In the past, filtering elements have been utilized which included both coarse and fine filtering media in series. With a filtering element of this type, the liquid is caused to flow in series, first through the coarse filtering media and then through the fine filtering media, so that the coarse particles are filtered out in the coarse media and the finer particles, that pass through the coarse media, are caught in the final fine media.

Oils and other liquid hydrocarbons vary in viscosity as the temperature varies. This presents a serious problem in filters for use in lubrication systems of internal combustion engines. A filtering element which is designed to operate effectively in the removal of particles when the oil is warm, and flows readily through the medium, offers so much resistance to the flow of cold viscous oil that it is necessary to by-pass the filter when the oil is cold to insure a continuing supply of lubricating oil. While this by-pass method is utilized to avoid damage to the bearings and to provide an adequate oil supply, it does involve an undesirable compromise in that unfiltered oil carrying potentially damaging particles is supplied to the bearings and other moving parts of the engine.

In an attempt to overcome this problem, filters have been designed in which coarse and fine filtering media are arranged in parallel with respect to the flow of oil, so that a portion of the oil will pass through the coarse media at all temperatures which results in the removal of the coarser particles. However, some of the finer particles in the oil are not removed and are delivered to the bearings and other moving parts.

U.S. Pat. No. 3,384,241 is directed to a graduated density liquid filter element in which fine and coarse filtering media are arranged such that the resistance to flow to the liquid through the media varies at different locations along the length of the filter element so that the element is capable of providing adequate flow, as required by the bearings, at all times. In accordance with the invention of U.S. Pat. No. 3,384,241, the graduated density filter element has a cylindrical shape and is composed of a pair of concentric layers of graduated thickness of coarse and fine filtering media with the coarse media disposed upstream of the fine media. With the construction of the aforementioned patent, the pattern of flow shifts with respect to the length of the element as flow resistance is increased due to loading at particular locations. The shifting of the flow pattern provides an automatic adjustment which results in a gradual increase in pressure drop across the element and increased service life. Problems, however, have been encountered in the fabrication of the graduated density filter element of the aforementioned patent in that it has been difficult to obtain a controlled variable or graduated thickness for the two layers. In practice, a cylindrical fabric sock is wrapped around the central tube of the filter and reversed to provide an annular space. The operator simultaneously introduces both coarse and fine filtering media into the annular space and the material is compacted by a ram. With this procedure, the operator is required to manually vary the amounts of coarse and fine material as they are introduced into the annular space and to maintain each media in a separate strata or layer in an attempt to provide the progressively varying thickness for the layers. This procedure is not only difficult to control, but is time consuming and costly.

SUMMARY OF THE INVENTION

The invention is directed to an improved method of making graduated density liquid filter element which has a precisely controlled graduated or variable density throughout its length. The liquid filter includes a cylindrical housing mounted on a base which has a liquid inlet, and a perforated center tube extends axially of the housing and is connected with an outlet in the base. The cylindrical filter element of the invention is located between the central tube and the housing.

The filter element is composed of two or more layers or matts of fibrous filtering media each having a different permeability and size with respect to the other. The two layers are disposed in partially overlapping relation and wound in coiled form to provide the cylindrical element. Due to the shape of the two layers and the amount of overlap, a filter element having a graduated or varying density is obtained in which the resistance to the flow of liquid varies throughout the length of the element.

The product of the invention provides either a graduated density filter element in which the density or porosity varies progressively along the length of the element, or an element having different densities at various locations along its length. In either case a precisely controlled density is achieved which is reproducible from part-to-part.

As a further advantage, the filter element can be more easily fabricated than graduated density filter elements of the past and by changing the size, shape and thickness of the coarse and fine filtering medium, along with the amount of overlap, the density characteristics of the filter element can be varied as desired.

Other objects and advantages will appear in the coarse of the following description.

DESCRIPTION OF THE DRAWINGS

The drawings illustrate the best mode presently contemplated of carrying out the invention.

In the drawings:

FIG. 1 is a longitudinal section of a filter assembly incorporating the filter element of the invention;

FIG. 2 is a section taken along line 2—2 of FIG. 1;

DESCRIPTION OF THE PREFERRED EMBODIMENT

Figure 3:
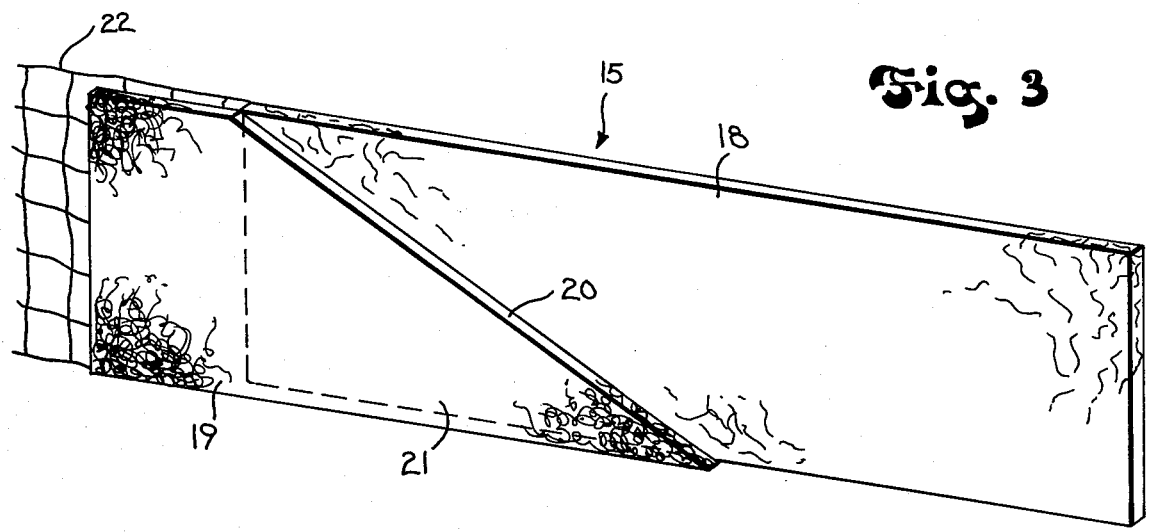
FIG. 3 is a perspective view of the layers of coarse and fine filtering media before being wound in coiled form.

FIGS. 1 and 2 illustrate a liquid filter assembly 1 which includes a base 2 having an outlet 3 for the filtered liquid, such as oil, and an inlet, not shown. A generally cylindrical housing 4 is supported on the peripheral flange 5 of the base, and a tube 6 is mounted centrally of the housing 4. The lower end of the tube 6 is threaded within a hub or spud 7 formed integrally with the base, while the upper end of the tube projects through an opening in the converging upper end of the housing 4 and receives a threaded stud 8 that is locked to center tube 6.

A metal gasket 9 is located between the head of the stud 8 and the upper end of the housing, while the lower end of the housing bears against a fiber gasket 10 which is located within a suitable recess in the flange 5 of base 2. With this construction the housing 4 is supported from the base 2 and central tube 6.

The filter element 11 of the invention is mounted concentrically around the central tube 6 and the flow of the oil, or other liquid to be filtered, is shown by the arrows in FIG. 1. The liquid enters the inlet in the base 2, flows upwardly into the annular space between the element 11 and the housing 4, then inwardly through the element and is discharged through a series of ports 12 into the interior of tube 6 where it can flow to the outlet 3.

The filter element 11 of the invention comprises an inner supporting perforated tube 13, preferably formed of metal, and an outer knitted fabric sock 14 which contains the filtering media 15. As illustrated in FIG. 1, a ring 16 is secured to the lower end of tube 13 and serves to support the filtering media 15, while a gasket 17 is provided to prevent leakage between the ring 16 and the top of the spud 7 when the housing 4 is forced downwardly to seal the filtering element in position. The top of the filtering element 11 is sealed against the upper converging end of the housing 4 by the resilience of the filtering media 15, as pressure is applied when the tube 6 is threaded down.

In accordance with the invention, the filter media 15 is composed of a layer 18 of coarse filtering material and a layer 19 of fine filtering material. Various types of materials may be used for the layers 18 and 19 of the filtering media. For example, the coarse material may comprise a mixture of 80% wood excelsior and 20% cotton waste, while a mixture of 50% wood excelsior and 50% cotton waste may be used for the fine material.

FIG. 3 illustrates the filtering media 15 prior to being wound in coiled form. As illustrated, the coarse layer 18 has a generally rectangular configuration, while the fine filtering layer 19 is provided with a diagonal edge 20 and partially overlaps the coarse layer 18 in the area designated by 21. The overlapped layers 18 and 19 are wound into coiled form with layer 19 encircling center tube 6, and due to the diagonal cut 20 the density of the coiled, composite filter media 15 will progressively vary throughout its axial length. For example, when in the wound state the portion of the cylindrical filter media 15 located along cross sectional station line A will be less dense than that at station line B due to the fact that there is a greater proportion of the fine filtering media 19 disposed along station line B rather than along line A.

In fabricating the filter element, the partially overlapped layers 18 and 19 are positioned on a layer of fabric netting 22, the end of which extends outwardly from the corresponding end of the fine filtering layer 19. The projecting end of netting 22 is attached to the perforated tube 13 by tape or the like and is wound around the tube, followed by the winding of the layers 18 and 19 around the tube. No attachment is required between the netting 22 and layers 18 and 19, for the natural roughness of the materials provides sufficient frictional resistance to enable the layers to be wound in coiled form about tube 13. Following the winding, the would coil can be laced or tied with string to maintain it in the coiled form, and the coil is then inserted into the fabric sock 14.

Figure 4:
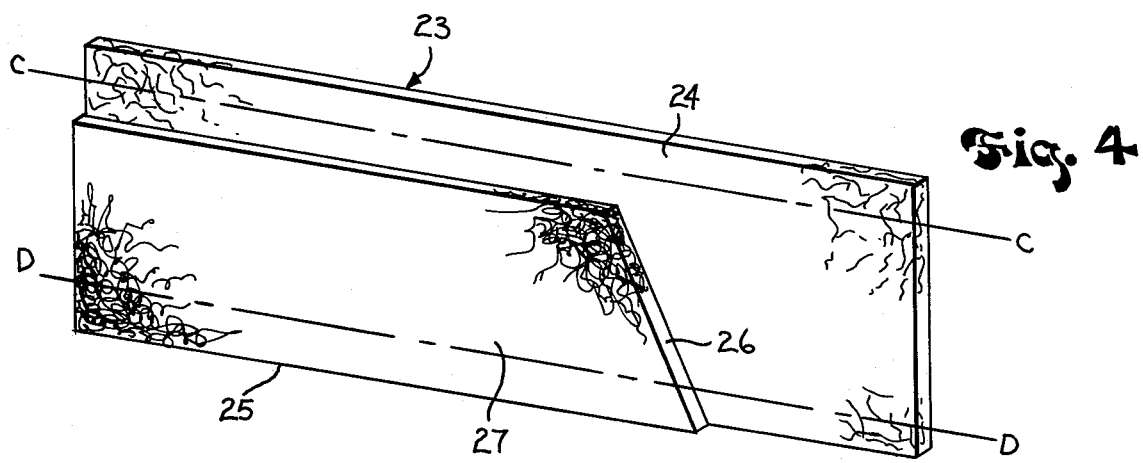
FIG. 4 is a perspective view similar to FIG. 3 showing a modified form of the invention.

FIG. 4 illustrates a modified form of the invention showing the filtering media 23 composed of a layer 24 of coarse filtering media and a layer 25 of fine filtering media. Layer 24 has a generally rectangular configuration, and the area of the coarse layer 24 is substantially larger than that of the layer 25. Layer 25 is provided with a diagonal edge 26. The coarse and fine filter layers are overlapped, as indicated by 27, and when the layers are wound into coiled form, as previously described, the portion of the cylindrical filtering media located along station line C, which is composed solely of coarse filtering media, will have a lesser density than the portion of the element located along station line D, which includes a substantial portion of the fine filtering material.

Figure 5:
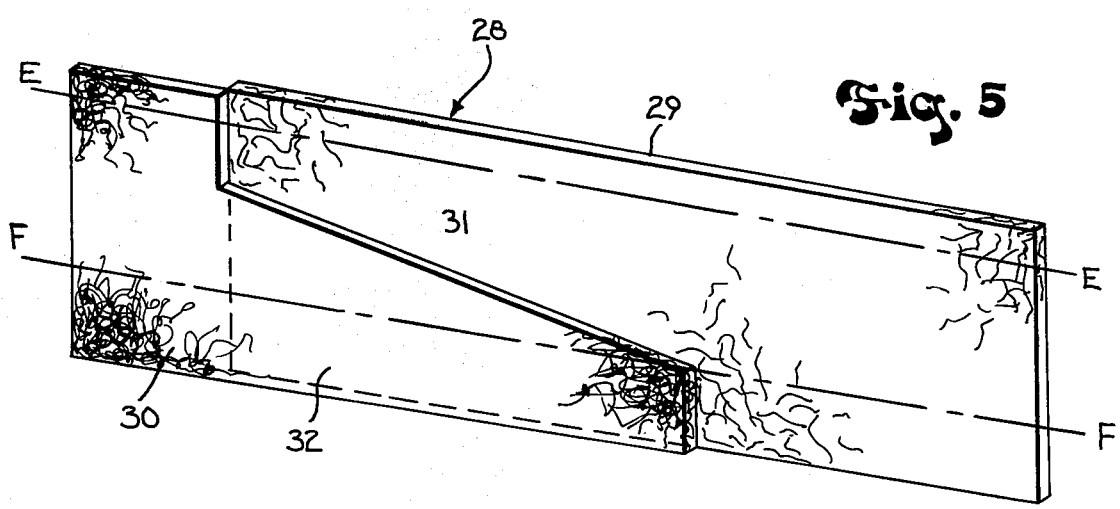
FIG. 5 is a perspective view similar to that of FIG. 3 showing a second modified form of the invention.

FIG. 5 illustrates a further modified form of the invention in which the filtering media 28, similar in function to filtering media 15 of the first embodiment, is composed of a layer 29 of coarse filtering material and a layer 30 of fine filtering material. In this embodiment, the coarse filtering layer 28 has a generally rectangular configuration, while the fine filtering layer 30 has an L-shaped configuration and a diagonal edge 31. Layer 30 partially overlaps the coarse filtering layer 29 in the area designated by 22.

When the layers of FIG. 5 are wound into coiled form, the portion of the cylindrical media 27 located along station line E will have a lesser density than that located along station line F, because the portion along line E contains a lesser amount of the fine filtering media.

The particular size, shape and thickness of the layers of coarse and fine filtering material can be varied, as can the amount of overlap between the layers to provide the desired density and permeability.

While the drawings have illustrated the low resistance segment of the filtering element being located at the top of the filter assembly, it is understood that the low resistance segment may be located anywhere along the axial length of the element. By proper selection of the size and shape of the coarse and fine filtering layers, and the amount and degree of overlap, the density can vary progressively along the axial length or different densities at various locations can be obtained. In either case a segment or portion of the filter element offers low flow resistance to permit minimum adequate flow of cold viscous oil through the element.

While the drawings illustrate the filtering element in hollow cylindrical form, it is contemplated that the element may be fabricated in other configurations.

Various modes of carrying out the invention are contemplated as being within the scope of the following claims particularly pointing out and distinctly claiming the subject matter which is regarded as the invention.

I claim:

1. A method of producing a liquid filter element, comprising the steps of forming a layer of first filtering media having a pair of longitudinal side edges and a pair of ends, forming a layer of second filtering media having different filtering characteristics than said first filtering media, disposing said second filtering media in at least partially overlapping relation with said first filtering media, said second filtering media having an edge bordering said overlapped area and disposed in non-perpendicular relation to the longitudinal side edges of the first filtering media, and winding the overlapped first and second filtering media into a coil in a manner such that said side edges are disposed at the ends of said coil to provide a generally cylindrical filter element, whereby the cylindrical filter element has a progressively graduated density along at least a portion of its axial length.

2. The method of claim 1, wherein said first and second filtering media have different shapes.

3. The method of claim 1, wherein said first filtering media is a coarse media and said second filtering media is a fine media having a greater density than said coarse media.

4. The method of claim 1, including the steps of forming the second filtering media with a pair of longitudinal side edges disposed at an acute angle to said edge, and said step of disposing said second filtering media in overlapping relation includes positioning the side edges of the second filtering media in generally parallel relation to the side edges of the first filtering media.

* * * * *

UNITED STATES PATENT AND TRADEMARK OFFICE
CERTIFICATE OF CORRECTION

PATENT NO. : 4,187,136

DATED : FEBRUARY 5, 1980

INVENTOR(S) : WILLIAM G. NOSTRAND

It is certified that error appears in the above-identified patent and that said Letters Patent are hereby corrected as shown below:

Column 1, line 51, Cancel "to" and substitute therefor ---of---
Column 2, line 52, Cancel "coarse" and substitute therefor ---course---, Column 4, line 11, Cancel "would" and substitute therefor ---wound---, Column 4, line 38, Cancel "22" and substitute therefor ---32---

Signed and Sealed this

Ninth Day of September 1980

[SEAL]

Attest:

SIDNEY A. DIAMOND

Attesting Officer

Commissioner of Patents and Trademarks